United States Patent
Lin

(10) Patent No.: US 10,471,877 B2
(45) Date of Patent: Nov. 12, 2019

(54) EXPANDABLE FOLDING RECREATIONAL VEHICLE

(71) Applicant: Yun Lin, Shenzhen (CN)

(72) Inventor: Yun Lin, Shenzhen (CN)

( * ) Notice: Subject to any disclaimer, the term of this patent is extended or adjusted under 35 U.S.C. 154(b) by 15 days.

(21) Appl. No.: 15/570,023

(22) PCT Filed: Apr. 29, 2015

(86) PCT No.: PCT/CN2015/077791
§ 371 (c)(1),
(2) Date: Oct. 27, 2017

(87) PCT Pub. No.: WO2016/172874
PCT Pub. Date: Nov. 3, 2016

(65) Prior Publication Data
US 2018/0162259 A1   Jun. 14, 2018

(51) Int. Cl.
*B60P 3/34* (2006.01)
*B60P 3/36* (2006.01)
(Continued)

(52) U.S. Cl.
CPC ...... *B60P 3/34* (2013.01); *B60P 3/36* (2013.01); *B60P 3/39* (2013.01); *B60P 3/42* (2013.01); *B62D 63/061* (2013.01)

(58) Field of Classification Search
CPC ...... B60P 3/34; B60P 3/42; B60P 3/36; B60P 3/39; B62D 63/061
(Continued)

(56) References Cited

U.S. PATENT DOCUMENTS 6,729,678 B1 * 5/2004 Atcravi ............ B60P 3/34
296/165
2007/0170740 A1   7/2007 Di Franco
(Continued)

FOREIGN PATENT DOCUMENTS

CN   202528895   11/2012
CN   103085704   5/2013
(Continued)

OTHER PUBLICATIONS

International Search Report filed in PCT/CN2015/077791 dated Feb. 4, 2016.

*Primary Examiner* — Joseph D. Pape
*Assistant Examiner* — Dana D Ivey
(74) *Attorney, Agent, or Firm* — Rankin, Hill & Clark LLP

(57) ABSTRACT

This disclosure relates to recreational vehicles (RV's) and discloses an expandable folding recreational vehicle (RV) that includes a chassis and a carriage house mounted on the chassis. The carriage house includes: a living room configured for a resident to perform activities; a bedroom configured for the resident to rest or sleep; a kitchen configured for the resident to prepare food and cook; a bathroom configured for the resident to urinate, defecate, bathe, or wash up; an electrical system operatively connected with the living room, the bedroom, the kitchen, and the bathroom; and a first and a second drive assembly configured for contracting or expanding the living room and the bedroom. The kitchen and the bathroom are arranged adjacent to each other on the chassis, and the living room and the bedroom are contractible and disposed on both sides of the chassis, respectively.

19 Claims, 10 Drawing Sheets

(51) Int. Cl.
  *B60P 3/42* (2006.01)
  *B62D 63/06* (2006.01)
  *B60P 3/39* (2006.01)

(58) Field of Classification Search
  USPC .................................................... 296/26.01
  See application file for complete search history.

(56) References Cited

U.S. PATENT DOCUMENTS

| | | | |
|---|---|---|---|
| 2011/0057475 A1* | 3/2011 | Cunningham | B60P 3/07 296/165 |
| 2014/0001786 A1* | 1/2014 | Cantin | E04B 1/34357 296/26.14 |

FOREIGN PATENT DOCUMENTS

| | | |
|---|---|---|
| CN | 202935229 | 5/2013 |
| CN | 103318273 | 9/2013 |
| CN | 203172510 | 9/2013 |
| FR | 2573706 | 5/1986 |
| KR | 101009648 | 1/2011 |

* cited by examiner

EXPANDABLE FOLDING RECREATIONAL VEHICLE

TECHNICAL FIELD

This disclosure generally relates to recreational vehicles (RV's), and more particularly relates to an expandable folding RV.

BACKGROUND

Existing recreational vehicles (RV's) serve a dual purpose as "vehicle" and "house", but basically they belong to the "vehicle" category. Because of their fixed functionality and space whether in driving or stationing, an existing RV can only be used as a temporary residence in traveling as a result of their functional configuration and spatial scale. Existing portable buildings, which fundamentally are "houses", can change their spacial configurations as they are in transportation or in use, by folding and unfolding of their walls, which requires additional hoisting. But as they provide only protective structures without being embedded with furniture, portable buildings cannot fulfill the wholeness of home functionality. In this era of high degree of informatization, the concept of "home in travelling" becomes increasingly common and a new nomadic era is around the corner. The existing RV technology, however, cannot satisfy the users' dual need of travel and long-term residence.

SUMMARY

It is therefore an object of the disclosure to provide an expandable folding recreational vehicle (RV) which is intended to solve the problem of the existing RV technology being unable to satisfy the users' dual need of travel and long-term residence.

An expandable folding RV is provided that includes a chassis and a carriage house mounted on the chassis. The carriage house may include a living room configured for a resident to perform activities, a bedroom configured for the resident to rest or sleep, a kitchen configured for the resident to prepare food and cook, and a bathroom configured for the resident to urinate, defecate, bathe, or wash up. The kitchen and the bathroom may be disposed adjacent to each other on the chassis, while the living room and the bedroom may be disposed on both sides of the chassis, respectively.

The living room may include a first left side wall panel and a first right side wall panel that are disposed opposite to each other, and a foldable first movable bottom panel and a foldable first movable roof panel disposed on a top and a bottom of the first left and right side wall panels, respectively. The first left and right side wall panels together with the first movable bottom and roof panels may enclose a living space exposed on both sides, and a collapsible foldable first folding door may be provided on each of both sides of the living space.

The bedroom may include a second left side wall panel and a second right side wall panel that are disposed opposite to each other, as well as a foldable second movable bottom panel and a foldable second movable roof panel disposed on a top and a bottom of the second left and right side wall panels, respectively. The second left and right side wall panels together with the second movable bottom and roof panels may enclose a bedroom space exposed on both sides, and a collapsible foldable second folding door may be provided on each of both sides of the bedroom space.

A fixed bottom plate may be arranged on the chassis, while a fixed roof plate may be arranged on an opposite side of the fixed bottom plate. Thus, the fixed roof plate, the fixed bottom plate, the first left side wall panel, as well as the second right side wall panel may altogether enclose a main space having one end closed and the other end provided with an entrance door. Both the kitchen and the bathroom may be located at the closed end of the main space.

A first drive assembly may be arranged on a bottom of the chassis and configured for drivingly coupling to the first right side wall panel and the second left side wall panel. A second drive assembly may be provided on a top of the fixed roof plate and configured for drivingly coupling to the first right side wall panel and the second left side wall panel. The first drive assembly and the second drive assembly may be operable in cooperation to contract the living room and the bedroom.

The carriage house may further include an electrical system operatively connected with the living room, the bedroom, the kitchen, and the bathroom. The first drive assembly and the second drive assembly may each be operable in cooperation with the electrical system.

Typically, the living room may further include a sofa, a tea table, and a first video system disposed within the living space.

Typically, the bedroom may further include a bed, a bedside cabinet, a wardrobe, a television cabinet, and a second video system that are disposed within the bedroom space.

Typically, the kitchen may include a kitchen space, as well as a refrigerator, a stove, a sink, a range hood, an oven, and a cupboard provided within the kitchen space.

Typically, the bathroom may include a bathroom space, as well as a wash basin, a toilet, and a shower assembly disposed within the bathroom space.

Typically, a tow hook may be provided at one end of the chassis and configured for being coupled to the vehicle.

Typically, a first control interface may be provided on the chassis and coupled to the first and second drive assemblies and configured for being coupled to a vehicle control system.

Further, a second control interface may be provided on the chassis and electrically connected to the electrical system and configured for being coupled to the vehicle control system.

Further, the first drive assembly may include a first drive unit arranged on the bottom of the chassis, and two first telescopic rods respectively coupled to the first drive unit, where these two first telescopic rods may be coupled to the bottom of the first right side wall panel and the bottom of the second left side wall panel, respectively. The second drive assembly may include a second drive unit arranged on a top of the fixed roof plate, and two second telescopic rods respectively coupled to the second drive unit, where the two second telescopic rods may be coupled to the top of the first right side wall panel and the top of the second left side wall panel, respectively.

Typically, a first pneumatic bar may be arranged at a bottom of the first movable bottom panel and configured for raising and folding the first movable bottom panel. A second pneumatic bar may be arranged at a bottom of the second movable bottom panel and configured for raising and folding the second movable bottom panel. Both the first and second pneumatic bars may be coupled to the electrical system.

Further, wire ropes may be connected between the first pneumatic bar and the first movable bottom panel, as well as between the second pneumatic bar and the second movable bottom panel, and may be configured to hold the first pneumatic bar perpendicular to the first movable bottom panel, and the second pneumatic bar perpendicular to the second movable bottom panel.

Typically, telescopic caster wheels may be arranged at the bottom of the first right side wall panel and the bottom of the second left side wall panel, for supporting and facilitating movement.

Typically, first rails may be provided on and slidably engaged with the upper and lower ends of the first folding door, respectively, with the first rails being coupled to the first movable bottom panel and the first movable roof panel, respectively. Second rails may be provided on and slidably engaged with the upper and lower ends of the second folding door, respectively, with the second rails being coupled to the second movable bottom panel and the second movable roof panel, respectively.

Further, a first padlock may be provided on the first folding door and configured for locking the door, while a second padlock may be provided on the second folding door and configured for locking the second folding door.

Typically, telescoping stairs may be provided at the end of the fixed bottom plate near the entrance door and configured for the user to step on.

Typically, awnings may be provided at the tops of the first movable roof panel and the second movable roof panel.

Typically, a solar roof may be provided at the top of the fixed roof plate and electrically connected to the electrical system.

Typically, the first movable bottom panel, the first movable roof panel, the second movable bottom panel, and the second movable roof panel may each be foldable structures formed through hinges.

Typically, slots may be defined at the folds of the first movable bottom panel, the first movable roof panel, the second movable bottom panel, and the second movable roof panel, and seal strips may be provided within the slots.

According to the above-described technical solution, embodiments of the disclosure provide a living room and a bedroom, which are contractible or expandable, on both sides of the main space of the carriage house, respectively, and provide an independent bathroom and kitchen within the main space of the carriage house, so that the RV has the dual functionality as vehicle and house. In addition, the electrical system, the first drive assembly, and the second drive assembly can altogether operate in cooperation to contract or expand the living room and the bedroom, realizing the self-contraction or expansion of the carriage house. Therefore, the users' dual demand of travel and long-term residence can be satisfied.

BRIEF DESCRIPTION OF THE ACCOMPANYING DRAWINGS

DETAILED DESCRIPTION OF ILLUSTRATED EMBODIMENTS

The disclosure will now be described in greater detail with reference to the accompanying drawings and exemplary embodiments, through which the objects, solutions, and advantages of the disclosure will become readily apparent. It is to be appreciated however that the specific embodiments described herein are merely illustrative of and not intended to limit the disclosure.

Figure 1:
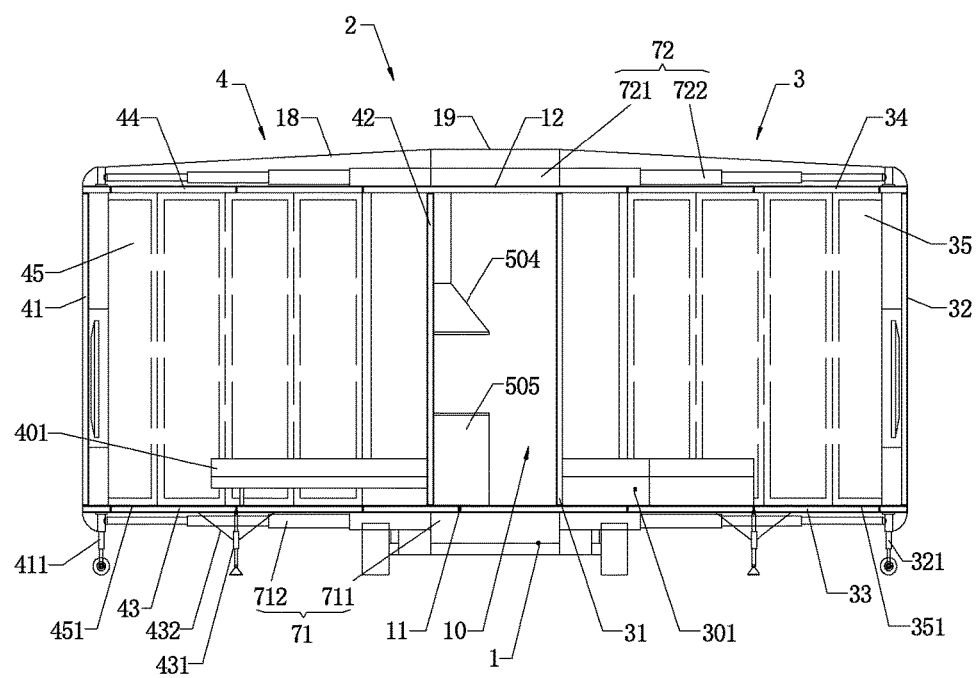
FIG. 1 is a schematic front view of an expandable folding RV in an expanded configuration in accordance with various embodiments of the disclosure.
Figure 2:
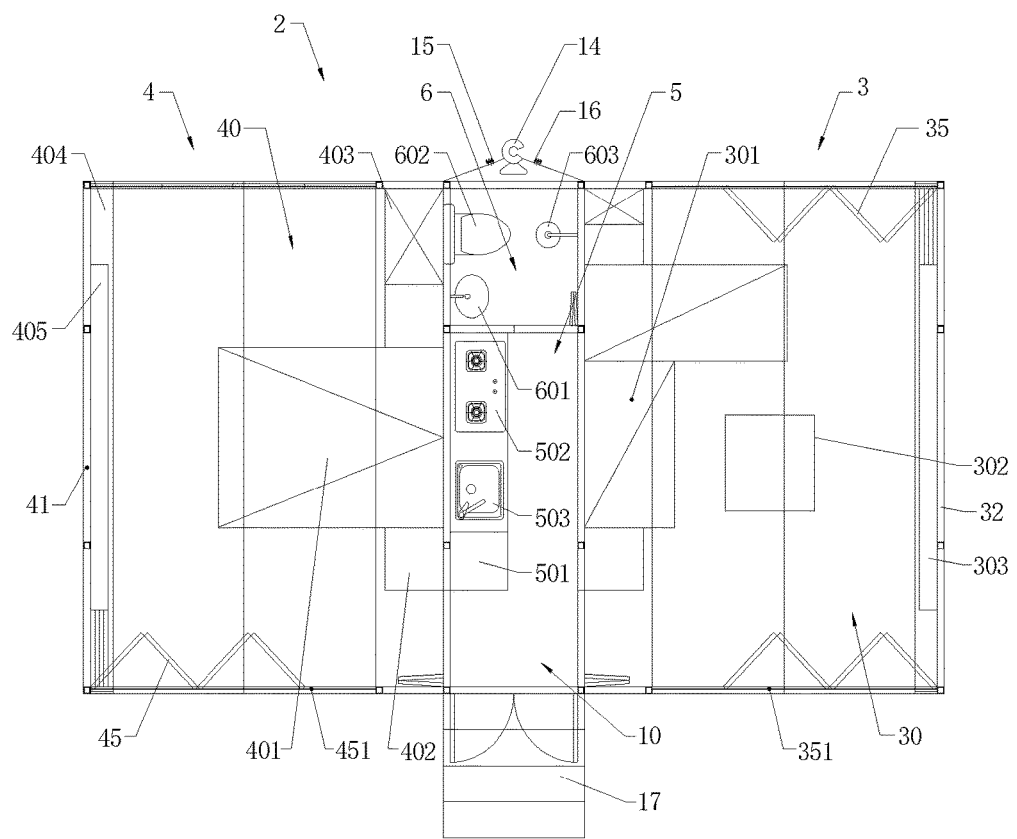
FIG. 2 is a schematic plan view of an expandable folding RV in an expanded configuration in accordance with various embodiments of the disclosure.
Figure 3:
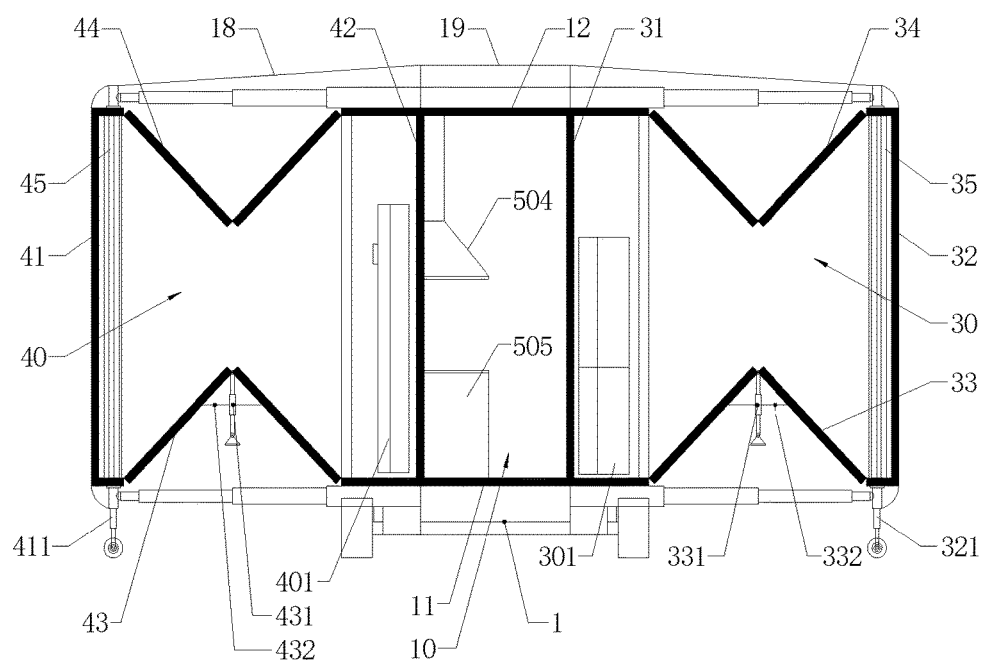
FIG. 3 is a schematic front view of an expandable folding RV in a contracted configuration in accordance with various embodiments of the disclosure.
Figure 4:
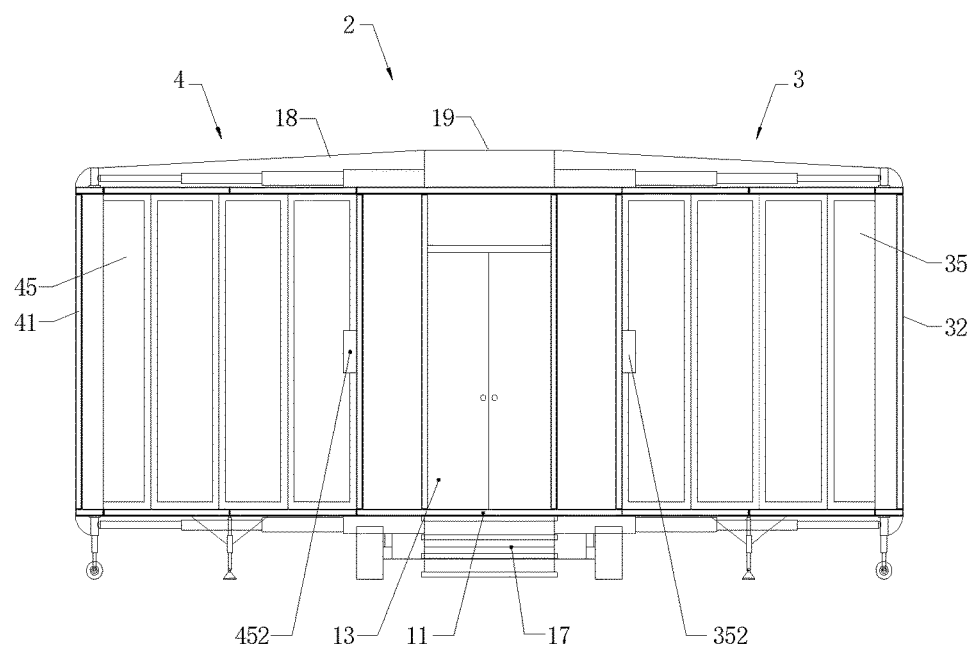
FIG. 4 is a schematic exterior view of an expandable folding RV in an expanded configuration in accordance with various embodiments of the disclosure.
Figure 5:
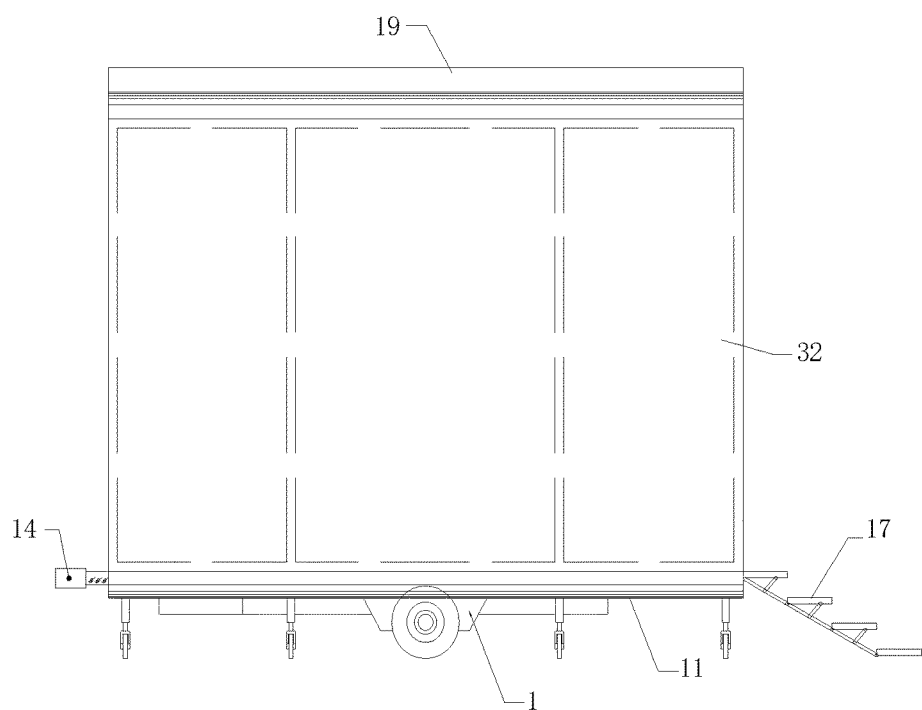
FIG. 5 is a schematic side view of an expandable folding RV in an expanded configuration in accordance with various embodiments of the disclosure.
Figure 6:
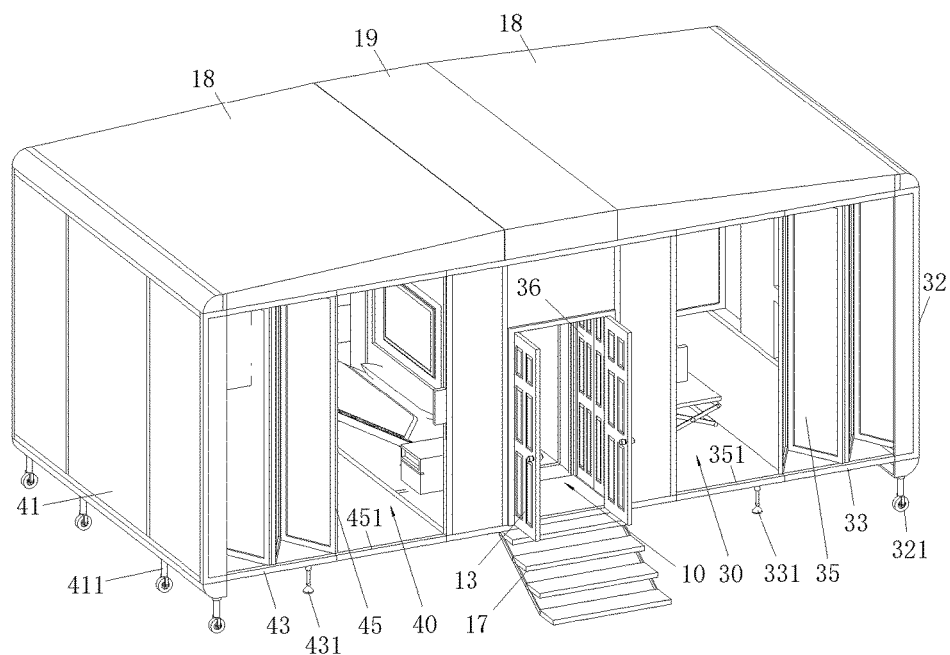
FIG. 6 is a first schematic perspective view of an expandable folding RV in an expanded configuration in accordance with various embodiments of the disclosure.
Figure 7:
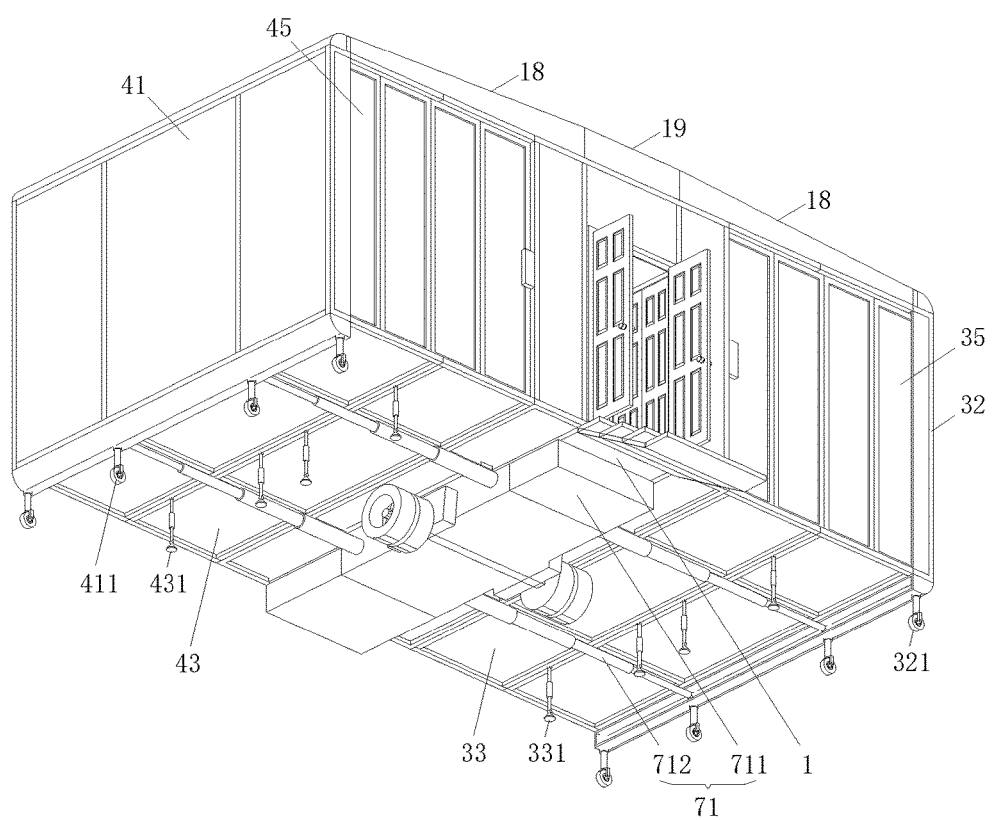
FIG. 7 is a second schematic perspective view of an expandable folding RV in an expanded configuration in accordance with various embodiments of the disclosure.
Figure 8:
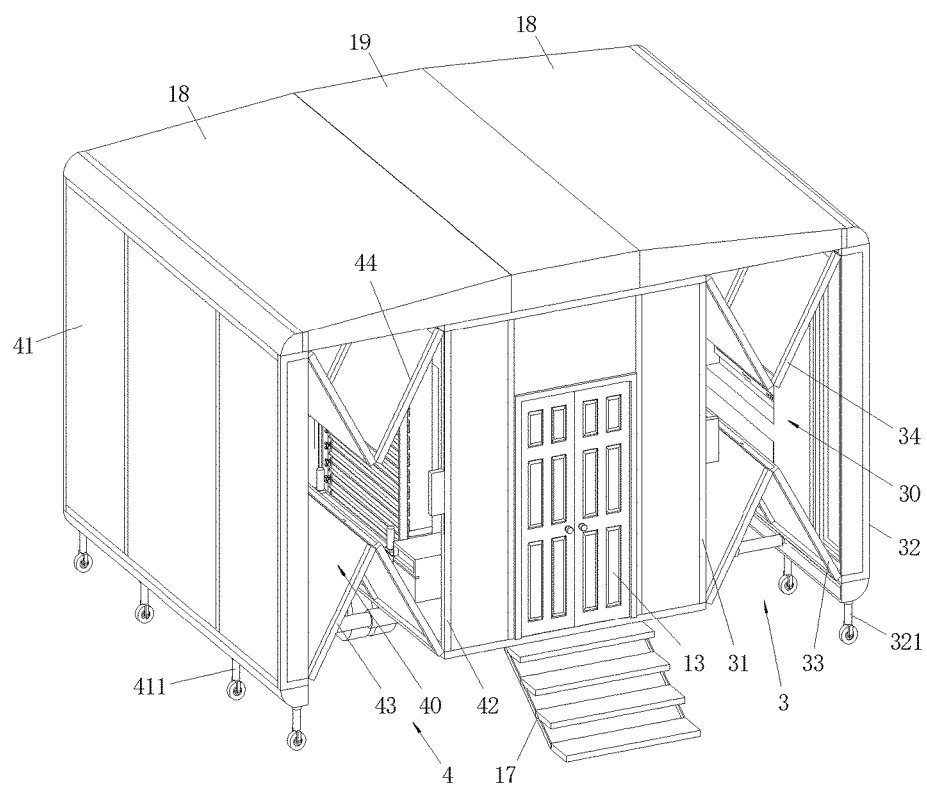
FIG. 8 is a first schematic perspective view of an expandable folding RV in a contracted configuration in accordance with various embodiments of the disclosure.
Figure 9:
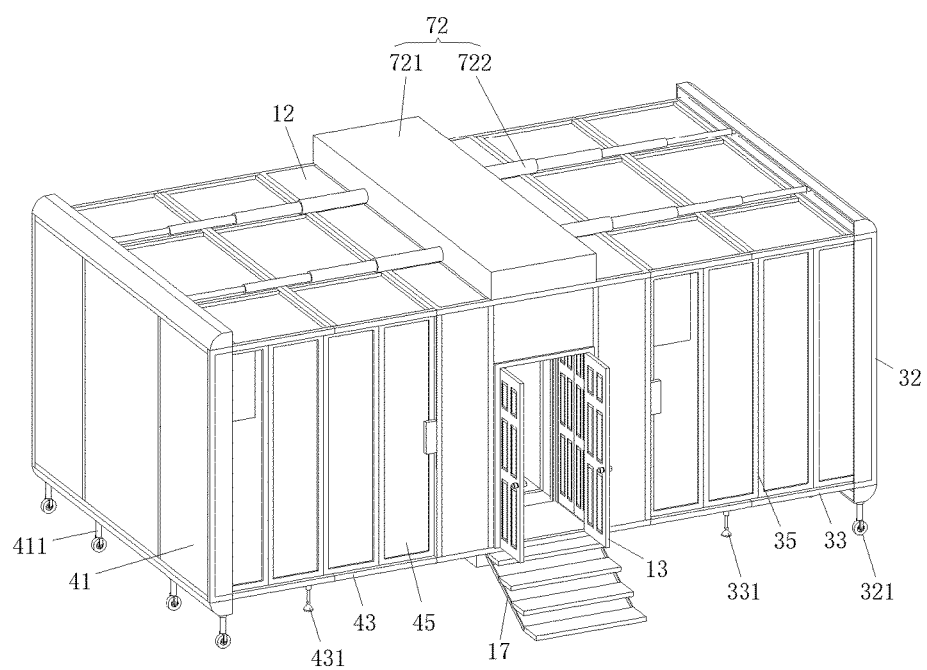
FIG. 9 is a partial perspective view of an expandable folding RV in an expanded configuration in accordance with various embodiments of the disclosure.
Figure 10:
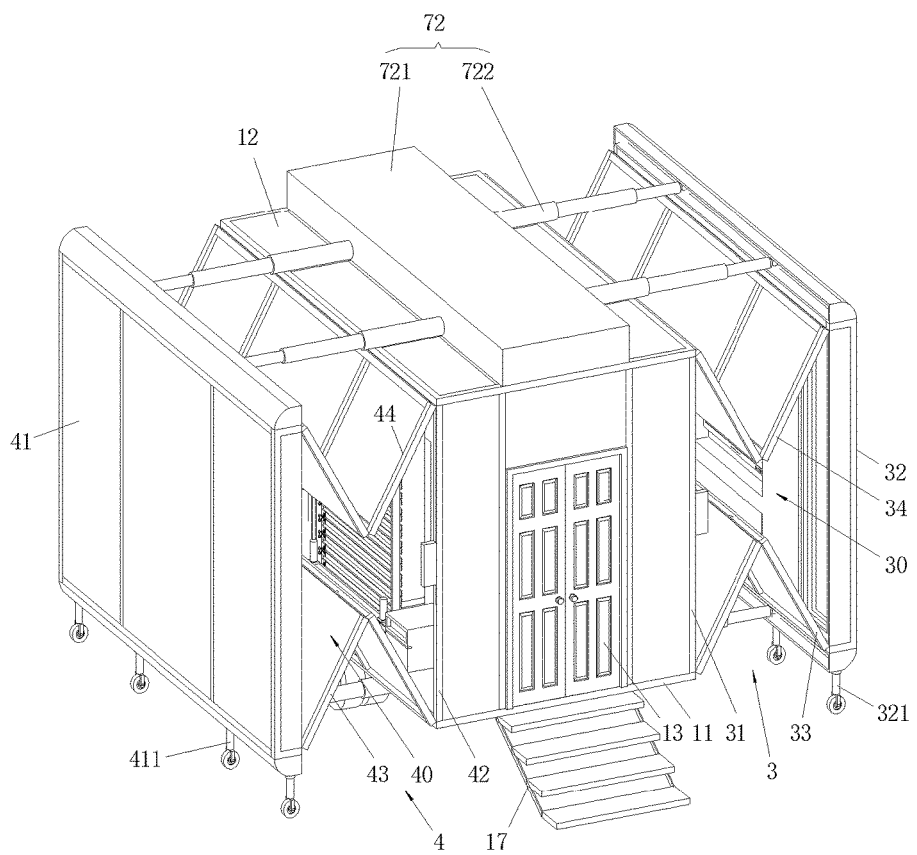
FIG. 10 is a partial perspective view of an expandable folding RV in a contracted configuration in accordance with various embodiments of the disclosure.

As illustrated in FIGS. 1 through 10, various embodiments of the disclosure provide an expandable folding recreational vehicle (RV) that includes a chassis 1 and a carriage house 2 mounted on the chassis 1. The carriage house 2 may include a living room 3, a bedroom 4, a kitchen 5, and a bathroom 6. The kitchen 5 and the bathroom 6 may be arranged adjacent to each other on the chassis 1 and along lengths of the chassis 1. The living room 3 and the bedroom 4 may be arranged along widths of the chassis 1 and at both sides of the chassis 1, respectively, where the kitchen 5 and the bathroom 6 are located between the living room 3 and the bedroom 4. The living room 3 is configured for a resident to perform daily activities, the bedroom 4 is configured for the resident to rest or sleep, the kitchen 5 is configured for the resident to prepare food and cook, and the bathroom 6 is configured for the resident to urinate, defecate, bathe, or wash up.

The above-described living room 3 may include a first left side wall panel 31, a first right side wall panel 32, a first movable bottom panel 33, and a first movable roof panel 34. The first left side wall panel 31 and the first right side wall panel 32 may be spaced apart from and opposite to each other. Both the first movable bottom and roof panels 33 and 34 may be foldable, and the first movable bottom panel 33 may be disposed at a bottom end of the first left and right side wall panels 31 and 32, while the first movable roof panel 34 may be disposed at a top end of the first left and right side wall panels 31 and 32. As such, the first left side wall panel 31, the first movable bottom panel 33, the first right side wall panel 32, and the first movable roof panel 34 would in turn be connected end to end to enclose a living space 30 exposed at both ends. A collapsible and foldable first folding door 35 may further be provided at either open side of the living space 30, so that when the user needs to expose the living space 30, he/she needs only to contract the first folding door 35; on the contrary, the first folding door 35 can be unfolded to accomplish closing.

The above-described bedroom 4 may include a second left side wall panel 41, a second right side wall panel 42, a second movable bottom panel 43, and a second movable roof panel 44. The second left side wall panel 41 and the second right side wall panel 42 may be spaced apart from and opposite to each other. Both the second movable bottom and roof panels 43 and 44 may be foldable, and the second movable bottom panel 43 may be disposed at a bottom end of the second left and right side wall panels 41 and 42, while the second movable roof panel 44 may be disposed at a top end of the second left and right side wall panels 41 and 42. As such, the second left side wall panel 41, the second movable bottom panel 43, the second right side wall panel 42, and the second movable roof panel 44 can in turn be connected end to end to enclose a bedroom space 40 exposed at both ends. A collapsible and foldable second folding door 45 may further be provided at either open side of the bedroom space 40, so that when the user needs to expose the bedroom space 40, he/she needs only to contract the second folding door 45; on the contrary, the second folding door 45 can be unfolded to accomplish closing.

A fixed bottom plate 11 may be arranged on the above-described chassis 1, and a fixed roof plate 12 may be provided on an opposite side of the fixed bottom plate 11; that is, the fixed roof plate 12 is disposed on the upper side of the fixed bottom plate 11. Thus, the first left side wall panel 31, the fixed bottom plate 11, the second right side wall panel 42, and the fixed roof plate 12 can successively be connected to one another to enclose a main space 10 having one end closed and the other end provided with an entrance door 13. The above-described kitchen 5 and bathroom 6 may both be disposed at the closed end of the main space 10. In addition, a living door 36 may be arranged in the first left side wall panel 31 to communicate the living space 30 with the main space 10 so as to facilitate the user's entry into the living space 30. Likewise, a bedroom door (not shown) may be provided in the second right side wall panel 42 to communicate the bedroom space 40 with the main space 10, allowing the user to enter the bedroom space 40.

A first drive assembly 71 may be installed at the bottom of the chassis 1. The first drive assembly 71 may be coupled to the bottom end of the first right side wall panel 32 and that of the second left side wall panel 41, and configured for driving the first right side wall panel 32 and the second left side wall panel 41 to move towards or apart from each other. A second drive assembly 72 may be installed at the top of the chassis 1. The second drive assembly 72 may be coupled to the top end of the first right side wall panel 32 and that of the second left side wall panel 41, and configured for driving the first right side wall panel 32 and the second left side wall panel 41 to move towards or apart from each other. Thus, the first drive assembly 71 and the second drive assembly 72 can jointly drive the first right side wall panel 32 and the second left side wall panel 41 to move towards or apart from each, enabling the contraction or expansion of the living room 3 and the bedroom 4.

The above-described carriage house 2 may further include an electrical system (not shown) operatively connected with the living room 3, the bedroom 4, the kitchen 5, and the bathroom 6. The above-described first drive assembly 71 and second drive assembly 72 may be coupled to and operative in cooperation with the electrical system; that is, the electrical system can be used to supply electrical energy to the entire carriage house 2.

In accordance with various embodiments, the expandable folding RV may have the following features.

A separate kitchen 5 and bathroom 6 are provided in the main space 10 of the carriage house 2, and a contractible or expandable living room 3 and bedroom 4 are provided at both sides of the main space 10, respectively, so that the expandable folding RV can fulfill the "house" purpose, which means it can be used for long-term residence. On the other hand, the electrical system, the first drive assembly 71, and the second drive assembly 72 can operate in cooperation to enable the contraction of the living room 3 and the bedroom 4—i.e., self-contraction of the carriage house 2—so that the whole carriage house 2 can become a trailer fulfilling the "vehicle" purpose of the expandable folding RV. That shows the expandable folding RV can fulfill the dual purpose as "house" and "vehicle". When it is expanded thus having the "house" function, the carriage house 2 of the expandable folding RV can be used for the user as a long-term residence. In contrast, when the carriage house 2 is contracted thus having the "vehicle" function, the user can connect it to an automobile for traveling. Therefore, the expandable folding RV can satisfy the users' dual demand of travel and long-term residence, and in addition, the carriage house 2 can be contracted or expanded in a simple and convenient manner.

In various embodiments, the above-described living room 3 may further include a sofa 301, a tea table 302, and a first video system 303, which may all be disposed within a living space 30 of the living room 3. The sofa 301 may typically be a set of a double sofa and a backed sofa provided on a fixed region side of the living space 30. The tea table 302 may typically be a portable tea table. The first video system 303 may be disposed on the first right side wall panel 32 within the living space 30. Before contracting the living room 3, the sofa 301 can be set upright and placed in the fixed region of the living space 30, while the portable tea table 302 can be put away, so that the living space 30 can be cleaned and contracted. As described above, various kinds of daily necessities can be provided in the living space 30 of the living room 3 so as to satisfy the user's daily living needs. Furthermore, the various daily necessities can be fixed or put away as appropriate so that the living space 30 can be contracted, facilitating the contraction of the living room 3. In other embodiments, of course, other living necessities can also be provided in the living space 30 of the living room 3 according to the actual situation and demand, where these living necessities, however, won't be specifically limited herein.

In various embodiments, the above-described bedroom 4 may further include a bed 401, a bedside cabinet 402, a wardrobe 403, a television cabinet 404, and a second video system 405, which may all be disposed within a bedroom space 40 of the bedroom 4. The bed 401 may typically be a double bed. The bed 401, the beside cabinet 402, the wardrobe 403, as well as the television cabinet 404 may be disposed on a fixed region side of the bedroom space 40, while the second video system 405 may be disposed on the second left side wall panel 41 within the bedroom space 40. Before contracting the bedroom space 40, the bed 401 can be stood upright and placed in the fixed region of the bedroom space 40, while the other movable items or objects can be fixed or put away, so that the bedroom space 40 can be cleaned and contracted. As described above, various kinds of daily necessities can be provided in the bedroom space 40 of the bedroom 4 so as to satisfy the user's daily resting demands. Furthermore, the various daily necessities can be fixed or put away as appropriate so that the bedroom space 40 can be contracted, facilitating the contraction of the bedroom 4. In other embodiments, of course, other daily necessities can also be provided in the bedroom space 40 according to the actual situation and demand, where these daily necessities, however, won't be specifically limited herein.

In various embodiments, the above-described kitchen 5 may include a kitchen space, where a refrigerator 501, a stove 502, a sink 503, a range hood 504, a cupboard 505, and an oven (not shown) may be provided in the kitchen space. In other embodiments, of course, other kitchen articles may also be provided in the kitchen space according to the actual situation and demand, where these kitchen articles won't be specifically limited, however. The above-described bathroom 6 may include a bedroom space, where a wash-up basin 601, a toilet 602, and a shower assembly 603 may be provided in the bedroom space. In other embodiments, of course, other sanitary articles or toiletries may also be provided in the bedroom space according to the actual situation and demand, where these sanitary articles or toiletries won't be specifically limited herein, however.

In various embodiments, a tow hook 14 may be arranged at one end of the above-described chassis 1 and configured for being coupled to an automobile. In addition, a first control interface 15 may be provided on the chassis 1 and configured for being coupled to a vehicle control system. Both the above-described first drive assembly 71 and second drive assembly 72 may be coupled to the first control interface 15, where the first and second drive assemblies 71 and 72 may typically be hydraulic drive systems, while the first control interface 15 may typically be a hydraulic brake interface. Furthermore, a second control interface 16 may also be provided on the chassis 1 and configured for being coupled to the vehicle control system, where the second control interface 16 may be electrically connected to the electrical system described supra. The second control interface 16 may typically be a strong-and-weak electrical interface. In other embodiments, of course, other components or parts can also be arranged on the chassis 1 according to the actual situation and demand, where these components or parts, however, won't be specifically limited herein.

In various embodiments, the above-described first drive assembly 71 may include a first drive unit 711 and two pairs of first telescopic rods 712. The first drive unit 711 may be fixedly disposed on the bottom of the chassis 1 described supra. The two pairs of first telescopic rods 712 may be coupled to both sides of the first drive unit 711, respectively. Outer ends of the two pairs of first telescopic rods 712 may be coupled to the bottom of the first right side wall panel 32 and to that of the second left side wall panel 41, respectively. The second drive assembly 72 may include a second drive unit 721 and two pairs of second telescopic rods 722. The second drive unit 721 may be fixedly disposed on the top of the above-described fixed roof plate 12. The two pairs of second telescopic rods 722 may be coupled to both sides of the second drive unit 721, respectively. Outer ends of the two pairs of second telescopic rods 722 may be coupled to the top of the first right side wall panel 32 and to that of the second left side wall panel 41, respectively. The first and second drive units 711 and 721 may typically be hydraulic drive systems, while the first and second telescopic rods 712 and 722 may typically be hydraulic telescopic rods. Both drive units may be coupled to the first control interface 15 described supra. That is, the user can stay in the automobile and operate the vehicle control system to control the operation of the first drive unit 71 and the second drive unit 72, enabling the automatic control of the contraction or expansion of the above-described living room 3 and bedroom 4. In other embodiments, of course, the first and second drive units 711 and 721 can also adopt other drive systems, such as mechanical-transmission-type drive systems, while the first and second telescopic rods 712 and 722 may also adopt helical telescopic rods or geared telescopic rods or the like according to the actual situation and demand, where they won't be specifically limited herein, however.

In various embodiments, both the above-described first movable bottom panel 33 and second movable bottom panel 43 may be foldable movable plate structures, which may be folding structures hingedly joined by two flat plates. In addition, a first pneumatic bar 331 may be arranged on the bottom of the first movable bottom panel 33 and configured for raising and folding the first movable bottom panel 33. The first pneumatic bar 331 may be located at the fold on the bottom of the first movable bottom panel 33 and may be coupled to the electrical system described supra. That is, the electrical system can be used to actuate the first pneumatic bar 331 so that the first pneumatic bar 331 may extend and raise the first movable bottom panel 33 and fold it in part. Likewise, a second pneumatic bar 431 may be arranged on the bottom of the second movable bottom panel 43 and configured for raising and folding the second movable bottom panel 43. The second pneumatic bar 431 may be located at the fold on the bottom of the second movable bottom panel 43 and may be coupled to the electrical system described supra. Which means the electrical system can be used to actuate the second pneumatic bar 431 so that the second pneumatic bar 431 may extend and raise the second movable bottom panel 33 and fold it in part. As described above, the first pneumatic bar 331, the second pneumatic bar 431, as well as the two drive assemblies described supra can operate in cooperation so that the first movable bottom panel 33 and the second movable bottom panel 43 can be folded, enabling the contraction of the carriage house 2. In other embodiments, of course, other means may also be adopted according to the actual situation and demand to facilitate the folding of the movable bottom panels.

In various embodiments, wire ropes may be connected between the above-described first pneumatic bar 331 and the first movable bottom panel 33, as well as between the second pneumatic bar 431 and the second movable bottom panel 43. In particular, two first wire ropes 332 may be connected between the first pneumatic bar 331 and the first movable bottom panel 33, where one end of each first wire rope 332 may be connected to the first pneumatic bar 331 while the other end may be connected to the bottom surface of the first movable bottom panel 33. Thus, the first pneumatic bar 331 can be held perpendicular to the first movable bottom panel 33 so that the first pneumatic bar 331 would be able to effectively raise and fold the first movable bottom panel 33. Likewise, two second wire ropes 432 may be connected between the second pneumatic bar 431 and the second movable bottom panel 43, where one end of each second wire rope 432 may be connected to the second pneumatic bar 431 while the other end may be connected to the bottom surface of the second movable bottom panel 43. Thus, the second pneumatic bar 431 can be held perpendicular to the second movable bottom panel 43 so that the second pneumatic bar 431 would be able to effectively raise and fold the second movable bottom panel 43. In other embodiments, of course, other means may also be adopted to keep the first pneumatic bar 331 perpendicular to the first movable bottom panel 33 and the second pneumatic bar 431 perpendicular to the second movable bottom panel 43.

In various embodiments, telescopic caster wheels may be arranged at the bottom of the first right side wall panel 32 and at the bottom of the second left side wall panel 41 and configured for supporting and facilitating movement. The telescopic caster wheels may be retracted when driving while may serve as a support in stationing and conversion. Their telescopic performance can help the first right side wall panel 32 and the second left side wall panel 41 remain level on a slight undulating ground. More particularly, a plurality of first telescopic caster wheels 321 may be disposed on the bottom of the first right side wall panel 32, and uniformly spaced along the bottom edge of the first right side wall panel 32. Similarly, a plurality of second telescopic caster wheels 411 may be disposed on the bottom of the second left side wall panel 41, and uniformly spaced along the bottom edge of the second left side wall panel 41. Thus, by providing the first telescopic caster wheels 321 and the second telescoping caster wheels 411 at the bottom of the first right side wall panel 32 and that of the second left side wall panel 41, the bottoms of the first right side wall panel 32 and the second left side wall panel 41 can be effectively supported. In addition, because the first and second telescopic caster wheels 321 and 411 are free wheels which are in contact with the ground, when the first right side wall panel 32 and the second left side wall panel 41 slide sideways, they can slide in a smoother manner, so that the above-described carriage house 2 can be contracted or expanded in a faster and simpler way. In other embodiments, of course, other means can also be adopted according to the actual situation and demand to make the sideslip more convenient and smoother, where these means, however, won't be specially limited herein.

In various embodiments, first rails 351 may be provided on and slidably engaged with the upper and lower ends of the first folding door 35, respectively, with the first rails 351 being adaptively connected to the first movable bottom panel 33 and the first movable roof panel 34, respectively. Likewise, second rails 451 may be provided on and slidably engaged with the upper and lower ends of the second folding door 45, respectively, with the second rails 451 being adaptively connected to the second movable bottom panel 43 and the second movable roof panel 44, respectively. Thus, the first folding door 35 and the first rails 351 can slidably engage with each other to allow the free sideways sliding of the first folding door 35, enabling the unfolding-or expanding-to-close of the first folding door 35. Similarly, the slidable engagement between the second folding door 45 and the second rails 451 allows the free sideways sliding of the second folding door 45, thereby enabling the unfolding-or expanding-to-close of the second folding door 45. By providing the first rails 351 and the second rails 451, the first folding door 35 and the second folding door 45 can slide sideways in a simpler and smoother manner, thereby enhancing the convenience in the user's closing the door through unfolding or expanding. In other embodiments, of course, other means can also be adopted according to the actual situation and demand to make the sideways sliding of the first and second folding doors 35 and 45 more convenient and smoother, where these means, however, won't be specially limited herein.

Further, in various embodiments, a first padlock 352 may be disposed on an outer end side of the above-described first folding door 35 and configured for locking the door, while a second padlock 452 may be disposed on an outer end side of the above-described second folding door 45 and configured for locking the second folding door. By providing the first padlock 352 and the second padlock 452, the first and second folding doors 35 and 45 can be locked tight, so that the safety of the living room 3 and the bedroom 4 in the closed state can be ensured. In other embodiments, of course, other auxiliary measures may also be taken to ensure the safety of the living room 3 and the bedroom 4 in the closed state.

In various embodiments, telescoping stairs 17 may extend outwards from the above-described fixed bottom plate 1. The telescoping stairs 17 may be disposed on the end of the fixed bottom plate 1 near the entrance door 13, and may be obliquely posed and configured for the user to step on to enter or exit the main space 10 described supra. Additionally, the telescoping stairs 17 may be contractible so that it can be unfolded when in use while contracted when not in use, which is simple, convenient, and practical.

In various embodiments, flexible awnings 18 may be provided on the top of the first movable roof panel 34 and the top of the second movable roof panel 44. By providing the awnings 18, the tops of the living room 3 and the bedroom 4 can have rainproof and sunshade functions, so that they can accommodate different weathers thus enhancing their functionality. In other embodiments, of course, other auxiliary measures can also be taken according to the actual situation and demand to protect the living room 3 and bedroom 4 from rain and snow, where these means, however, won't be specially limited herein.

In various embodiments, a solar roof 19 may be provided at the top of the fixed roof plate 12 and electrically connected to the electrical system. In the sunlight, the solar roof 19 can convert the light energy to electrical energy and reserve the electrical energy for future use. The electrical energy can be used by the user for the daily use of the carriage house 2, which is not only environmentally friendly but saves energy costs, enhancing the user experience.

In various embodiments, the first movable bottom panel 33, the first movable roof panel 34, the second movable bottom panel 43, and the second movable roof panel 44 may all be foldable structures formed through hinges. More particularly, both the first movable bottom panel 33 and the second movable bottom panel 43 may be foldable movable plate structures, each of which may be a folding structure hingedly joined by two flat plates. Likewise, both the first movable roof panel 34 and the second movable roof panel 44 may be foldable movable plate structures each of which may be a folding structure hingedly joined by two flat plates.

In various embodiments, slots (not shown) may be defined at the folds of the first movable bottom panel 33, the first movable roof panel 34, the second movable bottom panel 43, and the second movable roof panel 44. Furthermore, seal strips (not shown) may be provided within the slots so that the waterproof performance of the bottoms and tops of the living room 3 and bedroom 4 can be improved by the engagement of the slots and sealing tapes, thereby enhancing the waterproof performance of the entire carriage house 2. In other embodiments, of course, other auxiliary measures may also be taken according to the actual situation and demand to enhance the waterproof performance of the entire carriage house 2.

The foregoing description merely depicts some exemplary embodiments and is therefore not intended to be limiting the scope of the disclosure. Various equivalent changes, substitutions, and improvements that can be readily thought of by any person skilled in the art in light of the scope of the disclosure shall all be compassed within the protection of the disclosure. Therefore, the scope of this disclosure is defined only by the appended claims.

What is claimed is:

1. An expandable folding recreational vehicle (RV) comprising a chassis and a carriage house mounted on the chassis, wherein the carriage house comprises a living room configured for a resident to perform activities, a bedroom configured for the resident to rest or sleep, a kitchen configured for the resident to prepare food and cook, and a bathroom configured for the resident to urinate, defecate, bathe, or wash up, where the kitchen and the bathroom are disposed adjacent to each other on the chassis, and the living room and the bedroom are disposed on both sides of the chassis, respectively;

the living room comprises a first left side wall panel and a first right side wall panel disposed opposite to each other, a foldable first movable bottom panel and a foldable first movable roof panel respectively arranged on a top and a bottom of the first left and right side wall panels, wherein the first left and right side wall panels together with the first movable bottom and roof panels in turn are connected end to end to enclose a living space exposed on both sides, and a collapsible foldable first folding door is disposed on each of both open sides of the living space;

the bedroom comprises a second left side wall panel and a second right side wall panel disposed opposite to each other, a foldable second movable bottom panel and a foldable second movable roof panel respectively arranged on a top and a bottom of the second left and right side wall panels, wherein the second left and right side wall panels together with the second movable bottom and roof panels in turn are connected end to end to enclose a bedroom space exposed on both sides, and a collapsible foldable second folding door is provided on each of both open sides of the bedroom space;

a fixed bottom plate is arranged on the chassis, and a fixed roof plate is arranged on an opposite side of the fixed bottom plate, wherein the fixed roof plate, the fixed bottom plate, the first left side wall panel, as well as the second right side wall panel altogether enclose a main space with one end being closed and the other end being provided with an entrance door, where both the kitchen and the bathroom are located at the closed end of the main space;

a first drive assembly is provided on a bottom of the chassis and configured for drivingly coupling to the first right side wall panel and the second left side wall panel, and a second drive assembly is provided on a top of the fixed roof plate and configured for drivingly coupling to the first right side wall panel and the second left side wall panel, wherein the first drive assembly and the second drive assembly are operable in cooperation to contract the living room and the bedroom;

wherein the carriage house further comprises an electrical system operatively connected with the living room, the bedroom, the kitchen, and the bathroom, and the first drive assembly and the second drive assembly each are operatively connected with the electrical system.

2. The expandable folding RV of claim 1, wherein the living room further comprises a sofa, a tea table, and a first video system disposed within the living space.

3. The expandable folding RV of claim 1, wherein the bedroom further comprises a bed, a bedside cabinet, a wardrobe, a television cabinet, and a second video system disposed within the bedroom space.

4. The expandable folding RV of claim 1, wherein the kitchen comprises a kitchen space, as well as a refrigerator, a stove, a sink, a range hood, an oven, and a cupboard disposed within the kitchen space.

5. The expandable folding RV of claim 1, wherein the bathroom comprises a bathroom space, as well as a wash basin, a toilet, and a shower assembly disposed within the bathroom space.

6. The expandable folding RV of claim 1, wherein a tow hook is provided at an end of the chassis and configured for being coupled to an automobile.

7. The expandable folding RV of claim 1, wherein a first control interface is provided on the chassis, and is coupled to the first and second drive assemblies and configured for being coupled to a vehicle control system.

8. The expandable folding RV of claim 7, wherein a second control interface is provided on the chassis, and is electrically connected to the electrical system and configured for being coupled to the vehicle control system.

9. The expandable folding RV of claim 7, wherein the first drive assembly comprises a first drive unit arranged on the bottom of the chassis, and two first telescopic rods respectively coupled to the first drive unit, where the two first telescopic rods are coupled to a bottom of the first right side wall panel and a bottom of the second left side wall panel, respectively; the second drive assembly comprises a second drive unit arranged on the top of the fixed roof plate, and two second telescopic rods respectively coupled to the second drive unit, where the two second telescopic rods are coupled to a top of the first right side wall panel and a top of the second left side wall panel, respectively.

10. The expandable folding RV of claim 1, wherein a first pneumatic bar is arranged at a bottom of the first movable bottom panel and configured for raising and folding the first movable bottom panel; and a second pneumatic bar is arranged at a bottom of the second movable bottom panel and configured for raising and folding the second movable bottom panel, wherein the first and second pneumatic bars are each coupled to the electrical system.

11. The expandable folding RV of claim 10, wherein wire ropes are connected between the first pneumatic bar and the first movable bottom panel, and between the second pneumatic bar and the second movable bottom panel, wherein the wire ropes are configured to hold the first pneumatic bar perpendicular to the first movable bottom panel, and the second pneumatic bar perpendicular to the second movable bottom panel.

12. The expandable folding RV of claim 1, wherein telescopic caster wheels are arranged respectively at the bottom of the first right side wall panel and the bottom of the second left side wall panel for supporting and facilitating movement.

13. The expandable folding RV of claim 1, wherein first rails are provided on and slidably engaged with upper and lower ends of the first folding door, respectively, where the first rails are coupled to the first movable bottom panel and the first movable roof panel, respectively; and second rails are provided on and slidably engaged with upper and lower ends of the second folding door, respectively, where the second rails are coupled to the second movable bottom panel and the second movable roof panel, respectively.

14. The expandable folding RV of claim 13, wherein a first padlock is provided on the first folding door and configured for locking the first folding door, and a second padlock is provided on the second folding door and configured for locking the second folding door.

15. The expandable folding RV of claim 1, wherein telescoping stairs are provided at an end of the fixed bottom plate adjacent to the entrance door and configured for the user to step on.

16. The expandable folding RV of claim 1, flexible awnings are provided on the top of the first movable roof panel and the top of the second movable roof panel.

17. The expandable folding RV of claim 1, wherein a solar roof is provided at the top of the fixed roof plate and electrically connected to the electrical system.

18. The expandable folding RV of claim 1, wherein the first movable bottom panel, the first movable roof panel, the second movable bottom panel, and the second movable roof panel are each foldable structures with hinges.

19. The expandable folding RV of claim 1, wherein slots are defined at the folds of the first movable bottom panel, the first movable roof panel, the second movable bottom panel, and the second movable roof panel, wherein seal strips are provided within the slots.

* * * * *